(12) United States Patent
Aratani et al.

(10) Patent No.: US 6,335,837 B1
(45) Date of Patent: Jan. 1, 2002

(54) OPTICAL ELEMENT AND OPTICAL APPARATUS HAVING IT

(75) Inventors: Michiharu Aratani; Takeshi Akiyama, both of Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/626,739

(22) Filed: Jul. 26, 2000

(30) Foreign Application Priority Data

Jul. 28, 1999 (JP) .......................................... 11-213372

(51) Int. Cl.[7] ................................................ G02B 9/00
(52) U.S. Cl. ........................ 359/796; 359/720; 359/730
(58) Field of Search ........................ 359/720, 726–728, 359/730, 833–834, 837, 631, 633, 640, 796

(56) References Cited

U.S. PATENT DOCUMENTS

| | | | |
|---|---|---|---|
| 5,825,560 A | 10/1998 | Ogura et al. | 359/822 |
| 6,018,423 A * | 1/2000 | Takahashi | 359/633 |
| 6,166,866 A | 12/2000 | Kimura et al. | 359/729 |
| 6,215,596 B1 * | 4/2001 | Araki et al. | 359/631 |

FOREIGN PATENT DOCUMENTS

| | | |
|---|---|---|
| EP | 0 730 180 | 9/1996 |
| JP | 08-292371 | 11/1996 |
| JP | 08-292372 | 11/1996 |
| JP | 09-005650 | 1/1997 |
| JP | 10-068884 | 3/1998 |

* cited by examiner

Primary Examiner—Jordan M. Schwartz
(74) Attorney, Agent, or Firm—Fitzpatrick, Cella, Harper & Scinto

(57) ABSTRACT

An optical element has a first optical member which is a transparent body having two refracting surfaces and a reflecting, curved surface symmetric only with respect to one symmetry plane and a reference axis of which is present in the symmetry plane; and a second optical member which is a transparent body having two refracting surfaces and a reflecting surface and a reference axis of which is not present in the symmetry plane. One refracting surface of the second optical member is coupled to one refracting surface of the first optical member. The reference axis is defined by a ray passing an image center and a pupil center of an optical system including the optical element.

11 Claims, 7 Drawing Sheets

OPTICAL ELEMENT AND OPTICAL APPARATUS HAVING IT

BACKGROUND OF THE INVENTION

1. Field of the Invention

The present invention relates to an optical element used in optical devices such as video cameras, digital cameras, still video cameras, copiers, and so on.

2. Related Background Art

Various proposals have been made heretofore about optical systems making use of reflecting surfaces such as concave mirrors, convex mirrors, and so on. FIG. 7 is a schematic diagram of a so-called mirror optical system consisting of one concave mirror and one convex mirror.

In the mirror optical system in the same figure, object light 104 from an object is reflected by the concave mirror 101 toward the object while being coverged, then is reflected by the convex mirror 102, and thereafter is focused on the image plane 103. Numeral 105 designates the optical axis of this optical system.

This mirror optical system is based on the structure of the so-called Cassegrain reflecting telescope and is designed for the purpose of decreasing the entire length of the optical system by folding optical paths of a telescope lens system of long entire length composed of refracting lenses by use of two reflecting mirrors opposed to each other.

In the objective systems for telescopes, there are a lot of known types of optical systems for decreasing the entire length of the optical system by use of a plurality of reflecting mirrors, in addition to the Cassegrain type, for the same reason.

As described, the compact mirror optical systems have been constructed heretofore by efficiently folding the optical paths by use of the reflecting mirrors instead of lenses in the taking lenses of long entire length.

In these reflective optical systems, optical components need to be assembled with accuracy in order to achieve desired optical performance. Particularly, since errors in relative position accuracy of the reflecting mirrors strongly affect the optical performance, it is important to accurately adjust the position and angle of each reflecting mirror.

A solution to this issue is a proposal of a method of avoiding assembly errors of the optical components during assembly by constructing the mirror system with reflectors of one block.

For example, in the case of non-coaxial optical systems, the optical systems in a well-corrected state of aberration can be constructed by introducing the concept of the reference axis and making constituent surfaces of rotationally asymmetric, aspherical surfaces; Japanese Patent Application Laid-Open No. 9-5650 describes the design method thereof and Japanese Patent Applications Laid-Open No. 8-292371 and Laid-Open No. 8-292372 describe design examples thereof.

Such non-coaxial optical systems are called offaxial optical systems (which are optical systems defined as optical systems including curved surfaces (offaxial surfaces) the normal to which at an intersection with the reference axis is off the reference axis, where the reference axis is taken along a ray passing the center of the image and the center of the pupil, and in which the reference axis is in the folded state).

In the offaxial optical systems, the constituent surfaces are normally not coaxial and no eclipse occurs even at the reflecting surfaces, which facilitates construction of the optical systems using the reflecting surfaces. These optical systems also have such features that routing of optical paths is relatively free, an integral optical system can be formed readily by a method of integral molding of the constituent surfaces, and so on.

FIG. 8 is a schematic diagram to show an embodiment of the reflecting optical system disclosed in Japanese Patent Application Laid-Open No. 8-292371.

In FIG. 8, numeral 10 designates an optical element having a plurality of curved, reflecting surfaces, which is constructed of a transparent body of glass or the like. The optical element 10 has a concave refracting surface (entrance surface) 11 of negative refractive power, four reflecting surfaces comprising a concave mirror 12, a reflecting surface 13, a reflecting surface 14, and a concave mirror 15, and a convex refracting surface (exit surface) 16 of positive refractive power, which are formed in surfaces of the optical element 10 and in order named according to passage of rays from the object.

Numeral 2 denotes a stop (entrance pupil) placed on the object side of the optical element 10, 3 an optical corrector such as a quartz low-pass filter, an infrared cut filter, or the like, and 4 a final image plane, in which an image pickup surface of an image pickup device (imaging medium) such as CCD or the like is located. Numeral 5 indicates the reference axis of the photographing optical system (which is an axis passing the center 6 of the stop 2 and normally entering the center of the image plane 4). Numeral 6 represents the center of the stop 2.

The two refracting surfaces both are rotationally symmetric, spherical surfaces and all the reflecting surfaces are surfaces symmetric with respect to only the YZ plane.

The imaging action will be described next. The light 1 from the object is regulated in the amount of incident light by the stop 2 and thereafter is incident to the entrance surface 11 of the optical element 10. The light is reflected by the surfaces 12, 13 and thereafter once forms an image near the surface 13. Then the light is reflected successively by the surfaces 14, 15 and emerges from the exit surface 16. The light again forms an image on the final image plane 4 through the optical corrector 3. The object rays form the intermediate image near the surface 7 and pupil rays form an intermediate image between the surface 14 and the surface 15.

In this embodiment the direction of the reference axis of incidence to the optical element 10 is parallel and identical to the direction of the reference axis of emergence therefrom. The reference axis including incidence and emergence all lies on the plane of the drawing (the YZ plane).

As described, the optical element 10 functions as a lens unit having desired optical performance and positive refractive power as a whole, based on the refractive powers of the entrance and exit surfaces and the refractive powers of the curved reflectors therein.

The invention disclosed in Japanese Patent Application Laid-Open No. 8-292371 decreased the effective diameter of the optical system even in the reflecting optical system of wide angle of view by the structure in which the stop was placed closest to the object in the optical system and in which the object image was formed at least once in the optical system, and also decreased the entire length of the optical system in the predetermined direction by bending the optical paths in the optical system into the desired shape by the structure in which the reflecting surfaces forming the optical element were provided with their respective, appropriate, refractive powers and in which the reflecting surfaces forming the optical element were placed in the non-coaxial relation.

Japanese Patent Application Laid-Open No. 8-292371 also discloses an example of the reflecting optical system wherein the entrance reference axis and the exit reference axis are not within a common plane, through free routing of optical paths.

FIG. 9 is a schematic diagram of the main part of such a reflecting optical system as disclosed in Japanese Patent Application Ladi-Open No. 8-292371. In FIG. 9, numeral 10 designates an optical element having one reflecting plane and a plurality of curved, reflecting surfaces, which is constructed of a transparent body of glass or the like. The optical element 10 has a convex refracting surface (entrance surface) R2 of positive refractive power, six reflecting surfaces of a reflecting plane R3, a concave mirror R4, a convex mirror R5, a concave mirror R6, a reflecting surface R7, and a concave mirror R8, and a convex refracting surface (exit surface) R9 of positive refractive power, which are arranged in the order named according to passage of rays from the object and in surfaces of the optical element 10. R1 denotes a stop (entrance pupil) placed on the object side of the optical element 10, and R10 the final image plane on which the image pickup surface of the image pickup device such as the CCD or the like is located. Numeral 5 represents the reference axis of the photographing optical system.

The two refracting surfaces both are rotationally symmetric, spherical surfaces and all the curved, reflecting surfaces are surfaces each having only one symmetry plane.

This optical element 10 can also be produced by integral molding with a mold, including the entrance refracting surface R2, the reflecting plane R3, the curved, reflecting surfaces R4 to R8, and the exit refracting surface R9. However, the molding needs to take account of the shape of the mold, the direction of draft, the draft angle, and so on, and the shape of the optical element (particularly, the relation between effective diameters of R5 adjacent to the reflecting plane and the entrance refracting surface R2, etc.) is thus limited in order to satisfy those conditions.

Particularly, where the stop (entrance pupil) R1 is absent in front of the optical element, the optical effective diameter of the R1 surface is larger than those of the R2 surface and subsequent surfaces and the R1 surface etc. become large in comparison with the optical element. As a result, it will be difficult to integrally mold the optical element in that case.

In the cases wherein the entrance reference surface and the exit reference surface are not within a common plane, the optical element is of the asymmetric shape as illustrated in FIG. 9. Then the pressure will be exerted in nonuniform distribution on a molded product during molding and shrinkage will be nonuniform during cooling of the molded product.

SUMMARY OF THE INVENTION

An object of the present invention is to facilitate assembly and production of optical elements having a plurality of reflecting surfaces consisting of curved surfaces and/or planes in surfaces of a transparent body, and thus provide an optical element with high optical performance and an imaging apparatus using it.

Another object of the present invention is to permit construction of optical elements even in the structure in which the entrance reference axis and the exit reference axis are not within a common plane, without any restrictions, and thus provide an optical element advantageous in terms of molding accuracy as well and an imaging apparatus using it.

For accomplishing the above objects, an optical element of the present invention comprises a first optical member which is a transparent body having two refracting surfaces and a reflecting, curved surface symmetric only with respect to one symmetry plane and a reference axis of which is present in the symmetry plane; and a reflecting surface and the reference axis of which is not present in the symmetry plane. One refracting surface of the second optical member is coupled to one refracting surface of the first optical member. In addition, the reference axis is defined by a ray passing an image center and a pupil center of an optical system including the optical element of the present ivention.

DETAILED DESCRIPTION OF THE PREFERRED EMBODIMENTS

Before the description of the embodiments, let us describe the notation of component specifications of the embodiments and common items to all the embodiments.

Figure 1:
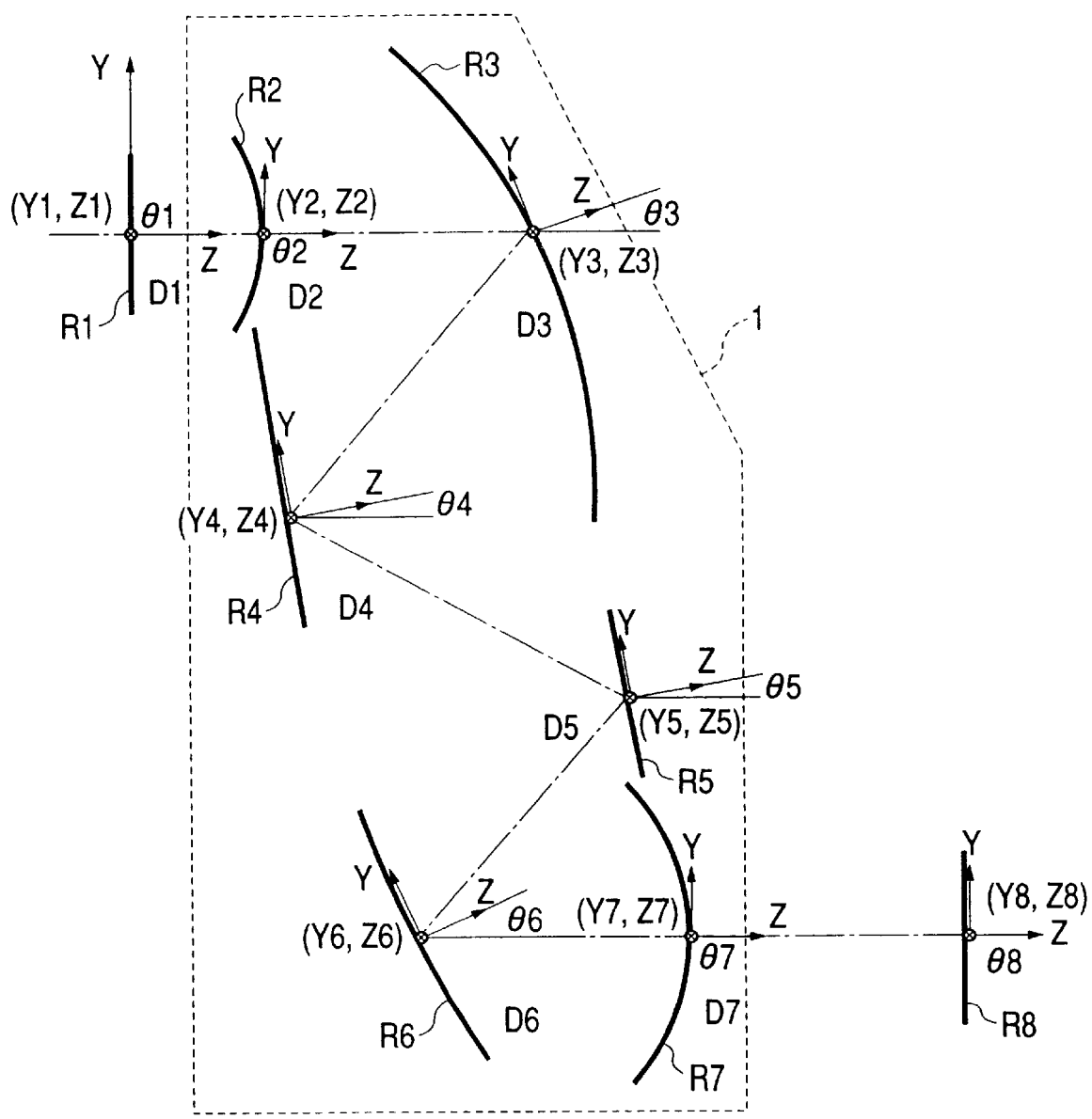
FIG. 1 is an explanatory diagram of coordinate systems of optical systems in the embodiments.

FIG. 1 is an explanatory diagram to illustrate coordinate systems for defining the structural data of an optical system (optical element) of the present embodiment. In the present embodiment the ith surface is a surface located at the ith position along a ray traveling from the object side to the image plane (which is a ray indicated by a chain line in FIG. 1 and which is called a reference-axis ray).

In FIG. 1 the first surface R1 is a stop, the second surface R2 a refracting surface coaxial with the first surface, the third surface R3 a reflecting surface tilted (or inclined) relative to the second surface R2, each of the fourth surface R4 and the fifth surface R5 a reflecting surface shifted and tilted relative to their preceding surface, and the sixth surface R6 a reflecting surface shifted and tilted relative to the fifth surface R5. The seventh surface R7 is a reflecting surface shifted and tilted relative to the sixth surface R6. The eighth surface R8 is the image plane.

The surfaces of the second surface R2 to the seventh surface R7 are formed on respective surfaces of one optical element made of glass, a plastic material, or the like, which is illustrated as optical element 1 in FIG. 1.

Therefore, in the structure of FIG. 1, the medium between the unrepresented object plane and the second surface R2 is the air, the medium between the second surface R2 and the seventh surface R7 is a certain, common medium, and the medium between the seventh surface R7 and the eighth surface R8 is the air.

Since the optical system of the present embodiment is a decentered optical system, the surfaces forming the optical system do not share an optical axis.

Therefore, an absolute coordinate system with the origin at the center of the ray effective diameter of the first surface (i.e., at the center of the pupil plane) is first set in the present embodiment.

Then a path of a ray (reference-axis ray) passing the origin and the center of the final image plane is defined as a reference axis of the optical system. Further, the reference axis in the present embodiment has the direction (orientation). The direction is a traveling direction of the reference-axis ray toward the image.

In the present embodiment the reference axis to serve as the reference of the optical system was set as described above, but the axis as the reference of the optical system can be any convenient axis in terms of optical design, handling of aberration, or expression of the shape of each surface forming the optical system. However, it is common practice to set a path of a ray passing the center of the image plane and either the center of the stop, the entrance pupil, the exit pupil, or the first surface of the optical system or the center of the final surface, as the reference axis to be used as the reference of the optical system.

Namely, in the present embodiment, the reference axis is set along the path of the ray (reference-axis ray) passing through the center point of the ray effective diameter of the first surface, i.e., the stop surface (pupil plane) and arriving at the center of the final image plane after refracted and reflected by the refracting surfaces and the reflecting surfaces. The order of the surfaces is set to be the order in which the reference-axis ray undergoes refraction and reflection.

The reference axis travels in the order of the surfaces with changing its direction according to the law of refraction or reflection, and finally reaches the center of the image plane.

The tilted optical surfaces forming the optical system of each embodiment are basically tilted all within the same plane. The axes of the absolute coordinate system are defined as follows.

Z-axis: reference axis passing the origin and traveling toward the second surface R2

Y-axis: straight line passing the origin and making the angle of 90° counterclockwise relative to the Z-axis within the tilt plane (i.e., in the plane of FIG. 1)

X-axis: straight line passing the origin and being perpendicular to each of the Z- and Y-axes (a straight line normal to the plane of FIG. 1)

For expressing the surface shape of the ith surface forming the optical system, a method of setting a local coordinate system with the origin at an intersecting point between the reference axis and the ith surface and expressing the surface shape of the surface by the local coordinate system facilitates recognition of the shape, rather than the method of expressing the shape of the surface by the absolute coordinate system. Therefore, the surface shape of the ith surface will be expressed by the local coordinate system in each of the embodiments provided with the structural data of the present invention.

A tilt angle of the ith surface within the YZ plane is expressed by an angle $\theta i$ (in units of °) the positive direction of which is the counterclockwise direction relative to the Z-axis of the absolute coordinate system. Therefore, the origin of the local coordinate system of each surface is located on the YZ plane in FIG. 1 in the present embodiment. There is no decentering of the surfaces in the XZ and XY planes.

Further, the y- and z-axes of local coordinates (x, y, z) for the ith surface are inclined at the angle $\theta i$ within the YZ plane relative to the absolute coordinate system (X, Y, Z) and, specifically, the axes of the local coordinate system are set as follows.

z-axis: straight line passing the origin of the local coordinate system and making the angle $\theta i$ counterclockwise on the plane of the drawing and in the YZ plane with respect to the Z-direction of the absolute coordinate system y-axis: straight line passing the origin of the local coordinate system and making 90° counterclockwise on the plane of the drawing and in the YZ plane with respect to the z-direction x-axis: straight line passing the origin of the local coordinate system and being perpendicular to the YZ plane Di represents a scalar amount indicating the spacing between the origins of the local coordinate systems for the ith surface and the (i+1)th surface, and Ndi and vdi the refractive index and Abbe's number, respectively, of the medium between the ith surface and the (i+1)th surface.

The optical system of the present embodiment has spherical surfaces and rotationally asymmetric, aspherical surfaces. Each of the spherical portions among them will be provided with the radius R1 of curvature thereof for expressing the spherical shape. The minus sign is assigned to the radius Ri of curvature when the center of curvature is located on the first surface side along the reference axis (the chain line in FIG. 1) running from the first surface to the image plane, but the plus sign when on the image plane side.

The spherical surfaces have the shape represented by the following equation:

$$Z = \frac{(x^2 + y^2)/R_i}{1 + \sqrt{1 - (x^2 + y^2)/R_i^2}}$$

The optical system of the present embodiment has at least one, rotationally asymmetric, aspherical surface and the shape thereof is expressed by the following equation:

$$z = A/B + C_{02}y^2 + C_{20}x^2 + C_{03}y^3 + C_{21}x^2y + C_{04}y^4 + C_{22}x^2y^2 + C_{40}x^4,$$

where $$A = (b+a)(y^2\cos^2 t + X^2)$$

$$B = 2ab\cos t \left(1 + \frac{(b-a)y\sin t}{2ab} + \sqrt{1 + \frac{(b-a)y\sin t}{ab} - \frac{y^2}{ab} - \frac{(4ab\cos^2 t + (b+a)^2\sin^2 t)x^2}{4a^2b^2\cos^2 t}}\right)$$

Since the above equation representing curved surfaces includes only the even-degree terms with respect to x, the curved surfaces defined by the above equation are of the shape of plane symmetry with respect to the symmetry plane of the yz plane. When the following conditions are further satisfied, the curved surfaces are symmetric with respect to the xz plane as well.

$$C_{03} = C_{21} = 0 \text{ and } t = 0$$

When the following conditions are further met, the curved surfaces are of the rotationally symmetric shape.

$C_{02}=C_{20}$ and $C_{04}=C_{40}=C_{22}/2$

When the above conditions are not met, the curved surfaces are of the rotationally asymmetric shape having no symmetry plane.

Figure 2:
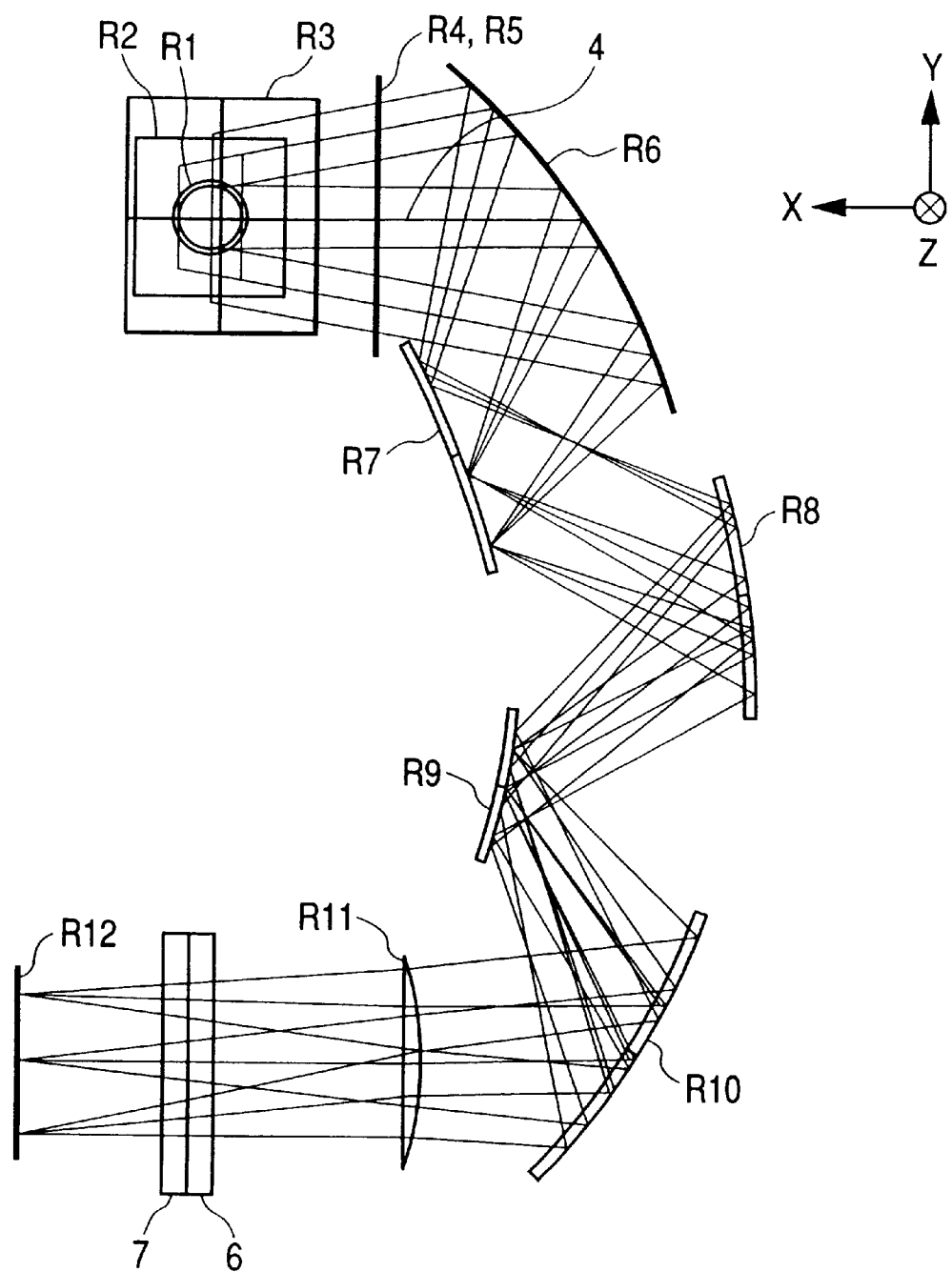
FIG. 2 is a cross-sectional view of the main part of the imaging apparatus including the optical element of Embodiment 1.
Figure 3:
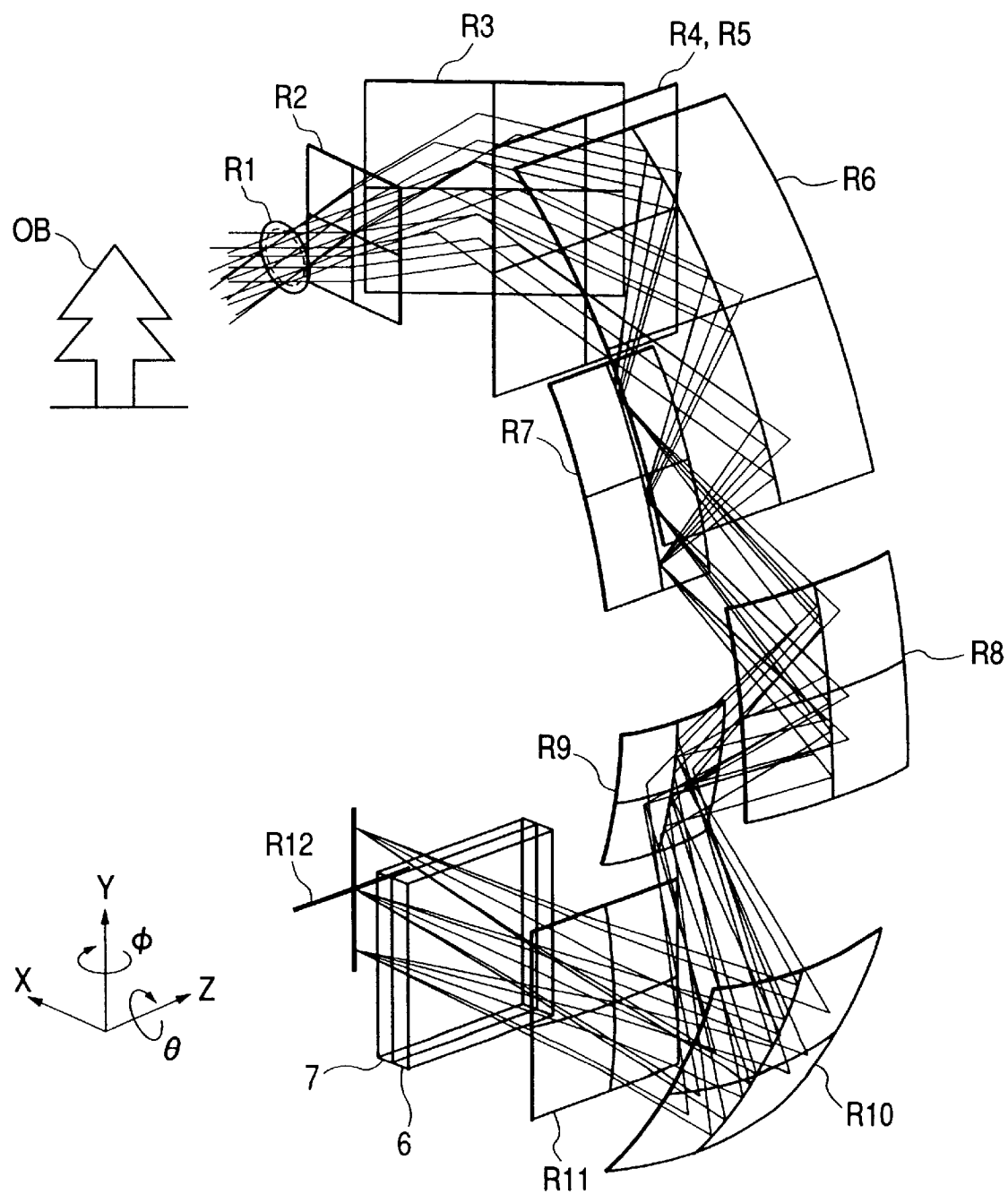
FIG. 3 is a perspective view of the imaging apparatus including the optical element of Embodiment 1.
Figure 4:
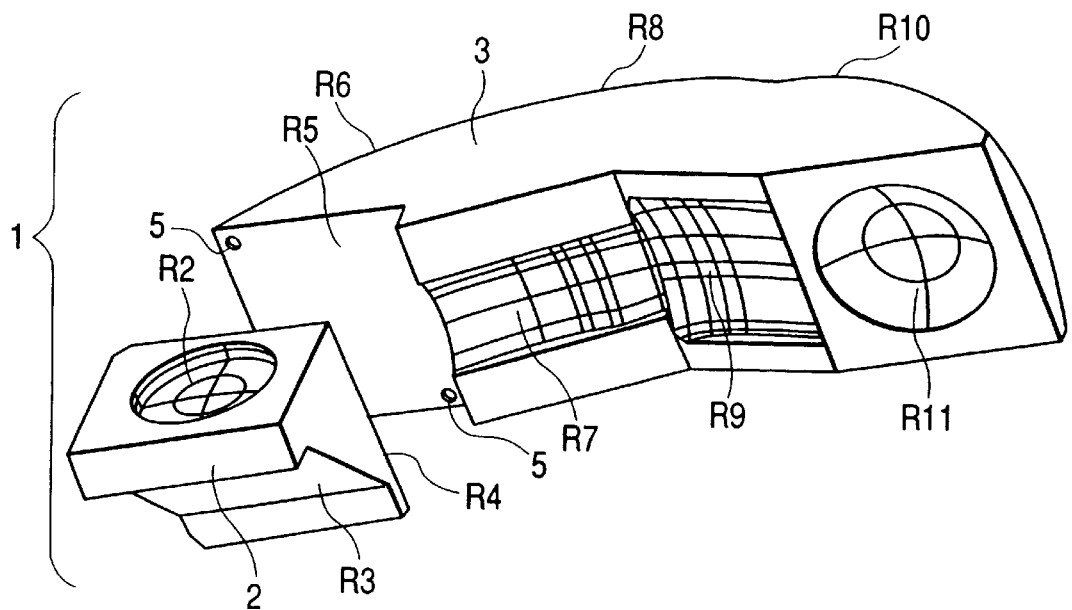
FIG. 4 is a structural diagram of the optical element of Embodiment 1.
Figure 5:
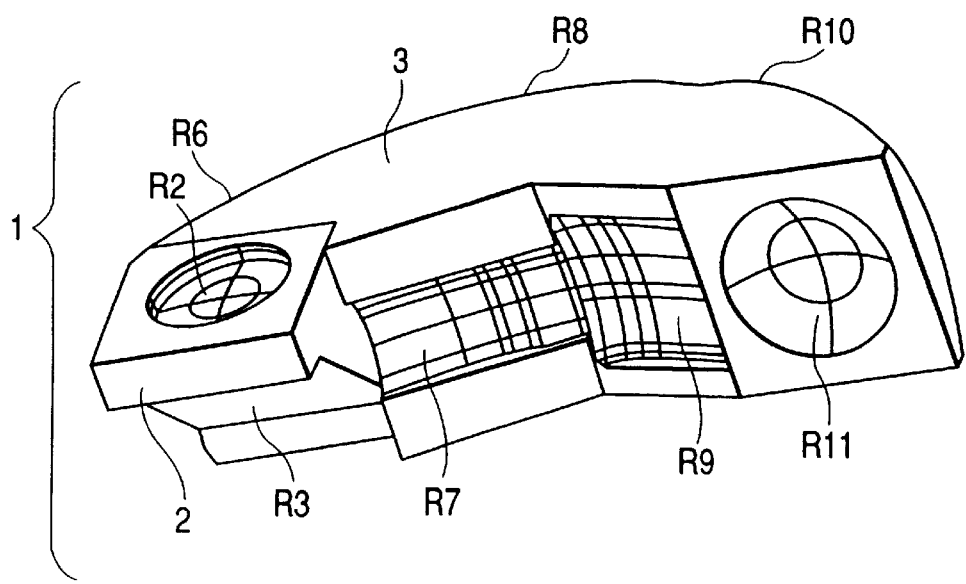
FIG. 5 is a structural diagram of the optical element of Embodiment 1.

FIG. 2 is a cross-sectional view within the XY plane of surfaces constituting an optical system (optical element) in Embodiment 1 of the present invention. FIG. 3 is a perspective view of the optical system in Embodiment 1 illustrated in FIG. 2 and also shows optical paths. FIG. 4 and FIG. 5 are schematic diagrams to show the structure of the optical element of the present embodiment.

In FIGS. 2 to 5, numeral 1 designates the optical element, 2 a prism, 3 an optical block (offaxial optical block), 4 the reference axis, 5 reference portions, 6 an infrared cut filter, and 7 an optical low-pass filter.

In the figures, the first surface R1 designates a stop, the second surface R2 a refracting surface (entrance surface) coaxial with the first surface, the third surface R3 a reflecting surface tilted relative to the second surface R2, and the fourth surface R4 a refracting surface (exit surface) tilted relative to the third surface R3.

The fifth surface R5 is a refracting surface (entrance surface) coaxial with the fourth surface R4, and each of the sixth surface R6, the seventh surface R7, the eighth surface R8, the ninth surface R9, and the tenth surface R10 is a reflecting surface shifted and tilted relative to their preceding surface. The eleventh surface R11 is a refracting surface shifted and tilted relative to the tenth surface R10.

The twelfth surface R12 is the image plane. The surfaces of the second surface R2 to the fourth surface R4 compose one prism (second optical member) made of a transparent medium to the visible light, such as glasses, plastics, or the like. The reference axis in the prism 2 is present within the ZX plane.

The surfaces of the fifth surface R5 to the eleventh surface R11 are formed on the surfaces of one transparent body made of a medium of glass, a plastic material, or the like and compose the offaxial optical block (first optical member) 3. Each of the reflecting surfaces R6 to R10 of the offaxial optical block 3 is of the surface shape symmetric only with respect to the XY plane, as described hereinafter, and the reference axis is present within the symmetry plane thereof (XY plane).

In the present embodiment the prism 2 is coupled to the optical block 3. The term "coupled" means that the exit surface R4 of the prism 2 and the entrance surface R5 of the optical block 3 are opposed to each other and the two surfaces are all in contact with each other, or that they are integrally joined to each other with a small aerial space in between.

In the present embodiment, since there are two types of tilts of the surfaces, i.e., those in the XZ plane and in the XY plane, the definition of the local coordinate systems is as follows. First, the angle of the tilt of the ith surface in the XZ plane is expressed by the angle $\phi i$ (in units of degrees) the positive direction of which is the clockwise direction with respect to the positive direction of the Y-axis, and the angle of the tilt in the XY plane by the angle $\theta i$ (in units of degrees) the positive direction of which is the counterclockwise direction with respect to the positive direction of the Z-axis.

Further, the axes of local coordinate points (x, y, z) for the ith surface are those obtained by first moving the origin of the absolute coordinate system (X, Y, Z) to (Xi, Yi, Zi), thereafter tilting the axes by the angle $\phi i$ in the XZ plane, and finally tilting the axes by the angle $\theta i$ in the XY plane, and, specifically, they are set as follows.

With the origin (Xi, Yi, Zi), z-axis: direction tilted by the angle $\phi i$ in the XZ plane and by the angle $\theta i$ in the XY plane with respect to the Z-direction which is the direction of the optical axis of the first surface y-axis: direction rotated by 90° counterclockwise with respect to the z-direction in the YZ plane x-axis: direction normal to the yz plane with the origin at the position of the vertex of the reflecting surface.

The structural data of the present embodiment is as follows.

In the present embodiment the first surface is the stop, as illustrated in FIG. 2. The horizontal half angle of view corresponds to half of the maximum angle of view of light incident to the stop R1 in the YZ plane of FIG. 2, and the vertical half angle of view to half of the maximum angle of view of light incident to the stop R1 in the XZ plane. The diameter of the stop R1 of the first surface is presented as a stop diameter. This is associated with brightness of the optical system. Since the entrance pupil is located at the first surface, the above stop diameter is equal to the diameter of the entrance pupil.

Further, an effective image range on the image plane is presented as an image size. The image size is expressed by a rectangular region of horizontal size and vertical size in the y-direction and in the x-direction, respectively, of the local coordinate system.

| | | | | | | | |
|---|---|---|---|---|---|---|---|
| horizontal half angle of view | | | | | 17.4° | | |
| vertical half angle of view | | | | | 13.3° | | |
| stop diameter | | | | | 1.30 mm | | |
| focal length | | | | | −5.6 mm | | |
| image size | | | | horizontal 3.2 mm × vertical 2.4 mm | | | |

| i | Xi | Yi | Zi | θi | φi | Di | Ni | vi |
|---|---|---|---|---|---|---|---|---|
| 1 | 0.00 | 0.00 | 0.00 | 0.00 | 0.00 | 2.00 | 1 | stop |
| 2 | 0.00 | 0.00 | 2.00 | 0.00 | 0.00 | 3.70 | 1.56396 | 60.90 refracting surface |
| 3 | 0.00 | 0.00 | 5.70 | 0.00 | −45.0 | 3.70 | 1.56396 | 60.90 reflecting surface |
| 4 | 0.00 | 0.00 | 5.70 | 0.00 | −90.0 | 0.00 | 1.56396 | 60.90 refracting surface |
| 5 | 0.00 | 0.00 | 5.70 | 0.00 | −90.0 | 4.60 | 1.56396 | 60.90 refracting surface |
| 6 | −8.30 | 0.00 | 5.70 | −90.0 | −56.4 | 6.57 | 1.56396 | 60.90 reflecting surface |
| 7 | −5.75 | −6.05 | 5.70 | −90.0 | −69.6 | 7.00 | 1.56396 | 60.90 reflecting surface |
| 8 | −12.03 | −9.16 | 5.70 | −90.0 | −83.9 | 7.00 | 1.56396 | 60.90 reflecting surface |
| 9 | −6.56 | −13.53 | 5.70 | 90.0 | −76.9 | 7.00 | 1.56396 | 60.90 reflecting surface |

-continued

| 10 | −9.53 | −19.87 | 5.70 | 90.0 | −57.6 | 4.83 | 1.56396 | 60.90 | reflecting surface |
| 11 | −4.70 | −19.87 | 5.70 | −90.0 | −90.0 | 8.89 | 1 | | refracting surface |
| 12 | 4.19 | −19.87 | 5.70 | −90.0 | −90.0 | | 1 | | image plane |

Shape of Spherical Surfaces
   R 2 surface r 2=∞
   R 3 surface r 3=∞
   R 4 surface r 4=∞
   R 5 surface r 5=∞
   R 11 surface r 11=10.518
Shape of Aspherical Surfaces
   R6 surface a=0 b=0 t=0

| $C02 = 3.01663e{-}02$ | $C20 = 4.42452e{-}02$ | |
| $C03 = 7.24404e{-}04$ | $C21 = 5.60684e{-}04$ | |
| $C04 = 2.90168e{-}05$ | $C22 = 1.65870e{-}04$ | $C40 = 9.97355e{-}05$ |

R7 surface a=0 b=0 t=0

| $C02 = 2.48623e{-}02$ | $C20 = 8.14249e{-}02$ | |
| $C03 = 4.69898e{-}03$ | $C21 = 5.03119e{-}03$ | |
| $C04 = 7.59516e{-}04$ | $C22 = 8.11060e{-}04$ | $C40 = 3.25912e{-}03$ |

R8 surface a=0 b=0 t=0

| $C02 = 2.65249e{-}02$ | $C20 = 3.94127e{-}02$ | |
| $C03 = 8.47119e{-}04$ | $C21 = 8.25360e{-}04$ | |
| $C04 = 1.61354e{-}05$ | $C22 = 1.21445e{-}05$ | $C40 = 1.35475e{-}04$ |

R9 surface a=0 b=0 t=0

| $C02 = 2.41090e{-}02$ | $C20 = 7.06654e{-}02$ | |
| $C03 = 5.60421e{-}04$ | $C21 = 7.99469e{-}03$ | |
| $C04 = 3.56578e{-}04$ | $C22 = 8.77111e{-}04$ | $C40 = 9.63156e{-}05$ |

R10 surface a=0 b=0 t=0

| $C02 = 3.14656e{-}02$ | $C20 = 4.48797e{-}02$ | |
| $C03 = 3.62278e{-}06$ | $C21 = 4.82659e{-}04$ | |
| $C04 = 7.15317e{-}05$ | $C22 = 1.27820e{-}04$ | $C40 = 9.39447e{-}05$ |

In the present embodiment the optical embodiment 1 is comprised of the prism 2 and the optical block 3. The prism 2 is joined to the optical block 3, and they may be spaced with a small aerial gap in between. Each of the prism 2 and the optical block 3 is made of a transparent body of glass, a plastic material, or the like. On the surfaces of the prism 2 there are formed the refracting surface R2, the reflecting surface (internal reflection surface) R3, and the refracting surface R4, in the order of passage of rays from the object. On the surfaces of the optical block 3 there are formed the refracting surface R5, the reflecting surfaces (internal reflection surfaces) R6, R7, R8, R9, and R10, and the refracting surfaces R11.

The imaging action of the optical system in the present embodiment will be described below. The light from the object OB is regulated in the amount of incident light by the stop (entrance pupil) R1 and then is incident to the entrance surface R2 of the prism 2. Then the light is reflected by the reflecting plane R3 to be deflected into the (negative) X-direction and then travels through the refracting surface R4 to enter the refracting surface R5 of the optical block 3. Then the light travels through the refracting surface R5 and is reflected by the reflecting surfaces R6, R7. After that, the light forms an intermediate image once and is then reflected successively by the reflecting surfaces R8, R9, and R10 to emerge in the (positive) X-direction from the refracting surface R11. The light then travels through the infrared cut filter 6 and the low-pass filter 7 and thereafter again forms an image on the final image plane R12.

When the refracting surface R4 of the prism 2 in the optical element 1 is joined to the refracting surface R5 of the optical block 3, unrepresented projections formed outside the ray effective area of the refracting surface R4 are fitted into depressions 5 (see FIG. 4) formed outside the ray effective area of the refracting surface R5, thereby ensuring the relative positions of the prism 2 and the optical block 3.

The assembly and adjustment steps can be simplified by providing the joint surfaces with the reference of position as described above.

In the present embodiment there occurs no refracting action at the refracting surfaces R4, R5, because the refracting surface R4 and the refracting surface R5 are formed in nearly identical shapes and because the prism 2 and the optical block 3 are made of materials with nearly equal refractive indexes.

This structure obviates the need for high-accuracy formation of the surface shapes of the refracting surfaces R4, R5 and facilitates the production of the prism 2 and the optical block 3.

In the present embodiment, the optical element 1 is of the asymmetric shape having neither of the symmetric properties. Therefore, when the optical element 1 was formed, for example, with a mold, the shape of the mold was also asymmetric and the structure of the mold was complex. As a result, the molding the difficult. Another issue was that during the molding there could occur distortion due to shrinkage of the material during cooling, with asymmetric distortion tending to appear in the molding of the asymmetric shape like the optical element 1.

In the present embodiment, the prism 2 is symmetric with respect to the ZX plane including the entrance reference axis (z-axis) and the optical block 3 is also symmetric with respect to the XY plane including the reference axis. Thus the optical element 1 of this asymmetric shape is divided into a plurality of blocks with symmetry (the prism 2 and optical block 3) and the blocks are formed separately, thereby avoiding the issues as described above, facilitating the production, and preventing degradation of performance due to the distortion.

The prism 2 is joined at the refracting surface R4 to the optical block 3, and if deviation occurs between the relative positions of the prism 2 and the optical block 3 during the joining operation the reference axis of the optical block 3 will undergo deviation, which will degrade the optical performance of the optical element 1. The change of performance due to this joint deviation will normally result in heavier degradation as the power increases in the optical surfaces on the object side of the joint surfaces.

In order to prevent the performance change due to the deviation of the joint surfaces, it is necessary to control the eccentric sensitivity of the joint surface R4 in a low level. Since the entrance surface R2, the reflecting surface R3, and the joint surface R4 are constructed all with small power in the present embodiment, the eccentric sensitivity of the joint surface R4 is approximately equal to a ratio of curvature of the joint surface R4, Cur4 (1/mm), to the power of the entire system, $\phi$ (1/mm). Accordingly, in order to prevent the performance change due to the deviation of the joint surfaces, it is desirable that the curvature Cur4 of the joint surface R4 to the power $\phi$ of the entire system (optical element) satisfy the following condition:

$$|Cur4/\phi|<0.1.$$

More desirably, the ratio is set to satisfy the following condition:

$$|Cur4/\phi v|<0.01.$$

It is also desirable that the curvature Cur2 (1/mm) of the entrance surface R2 of the prism 1 to the power $\phi$ (1/mm) of the entire system similarly satisfy the following condition:

$$|Cur2/\phi|<0.1.$$

More desirably, the ratio is set to satisfy the following condition:

$$|Cur2/\phi|<0.01.$$

It is also desirable that the curvature Cur3 (1/mm) of the reflecting surface R3 of the prism 1 to the power $\phi$ (1/mm) of the entire system similarly satisfy the following condition:

$$|Cur3/\phi|<0.1.$$

More desirably, the ratio is set to satisfy the following condition:

$$|Cur3/\phi|<0.01.$$

In the present embodiment, the refracting surface R2, the reflecting surface R3, and the refracting surface R4 forming the prism 2 all are planes to reduce the possibility of occurrence of the performance degradation due to the deviation of the joint surfaces, thereby simplifying the assembly and adjustment steps of the prism 2 and the optical block 3.

In the present embodiment the refracting surface R2, the reflecting surface R3, and the refracting surface R4 all are planes, but another conceivable configuration is such that R2 is an offaxial refracting surface, or R3 is an offaxial reflecting surface, or R4 is an offaxial refracting surface.

In that case, either of R2, R3, and R4 can be used for correction for aberration of the optical system, so that the optical system can be realized with higher performance.

In the present embodiment, the prism 2 and the optical block 3 are made of their respective materials having nearly equal coefficients of linear expansion. This structure can prevent deviation from occurring at the joint surface R4 even with expansion or constriction of the prism 2 and the optical block 3 according to change in the ambient temperature, thereby preventing the degradation of performance.

In the present embodiment the prism 2 and the optical block 3 are made of the same material, but it is a matter of course that they can be made of materials different from each other.

Some plastic materials deteriorate with age, e.g., some suffer decrease of transmittance because of ultraviolet light. For example, in cases wherein the prism 2 is made of a material resistant to the ultraviolet light, for example, glass (desirably, one with low transmittance, particularly, in the ultraviolet region), even if the optical block 3 is made of a plastic material, the temporal degradation of the optical performance due to the ultraviolet light can be prevented thereby.

It is also preferable that the transmittance in the infrared region be lowered by adding a dye or the like into the material of the prism 2 or the optical block 3. This structure can obviate the need for the infrared cut filter 6 and thus can decrease the number of components.

The similar effect is also achieved by forming a film not transmitting infrared light, on a refracting surface (e.g., on the refracting surface R2 or the like) or by constructing a reflecting surface (e.g. the reflecting surface R3 or the like), of a reflecting film not reflecting the infrared light.

Figure 6:
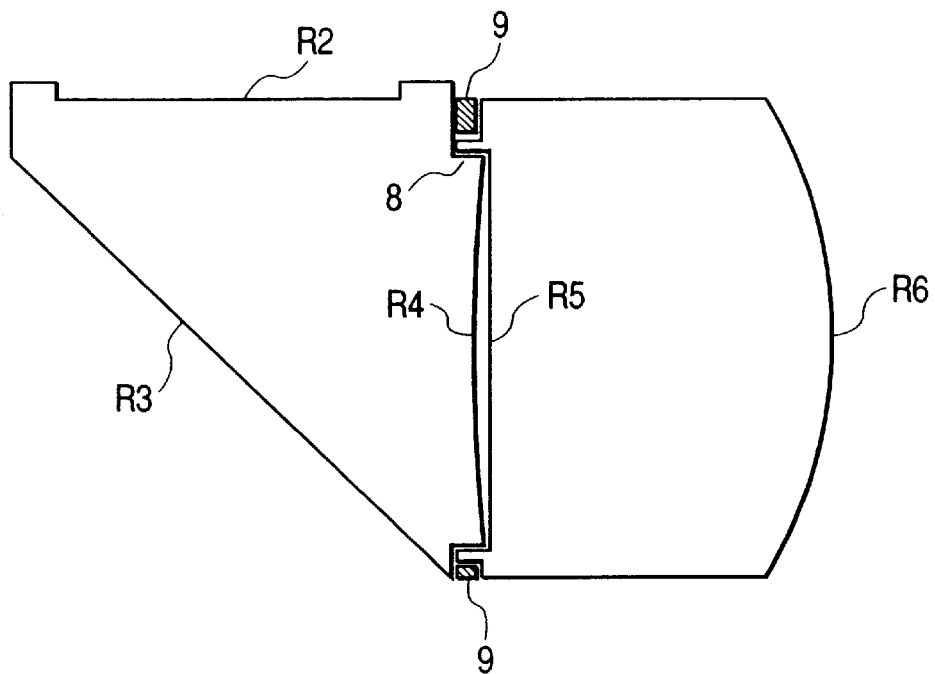
FIG. 6 is a structural diagram of the optical element of Embodiment 2.
Figure 7:
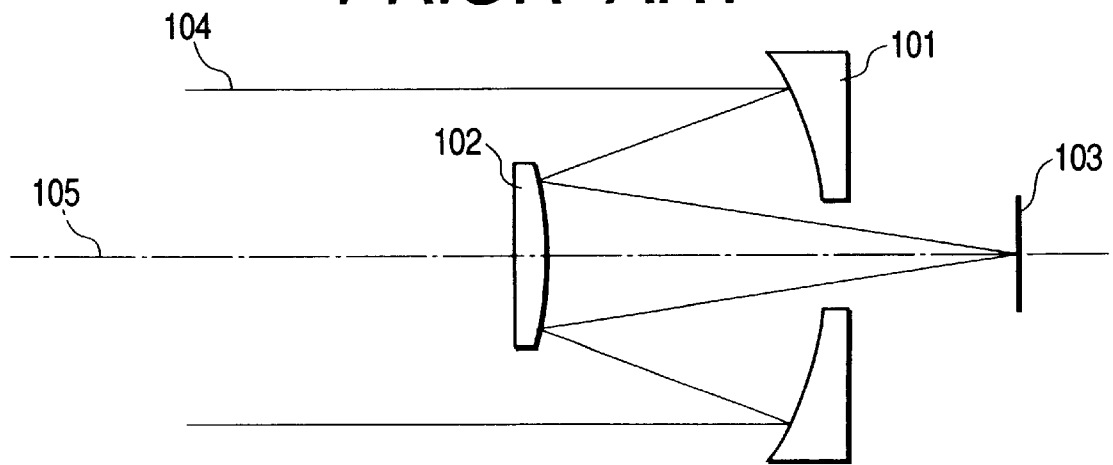
FIG. 7 is an explanatory diagram to illustrate the conventional optical system.
Figure 8:
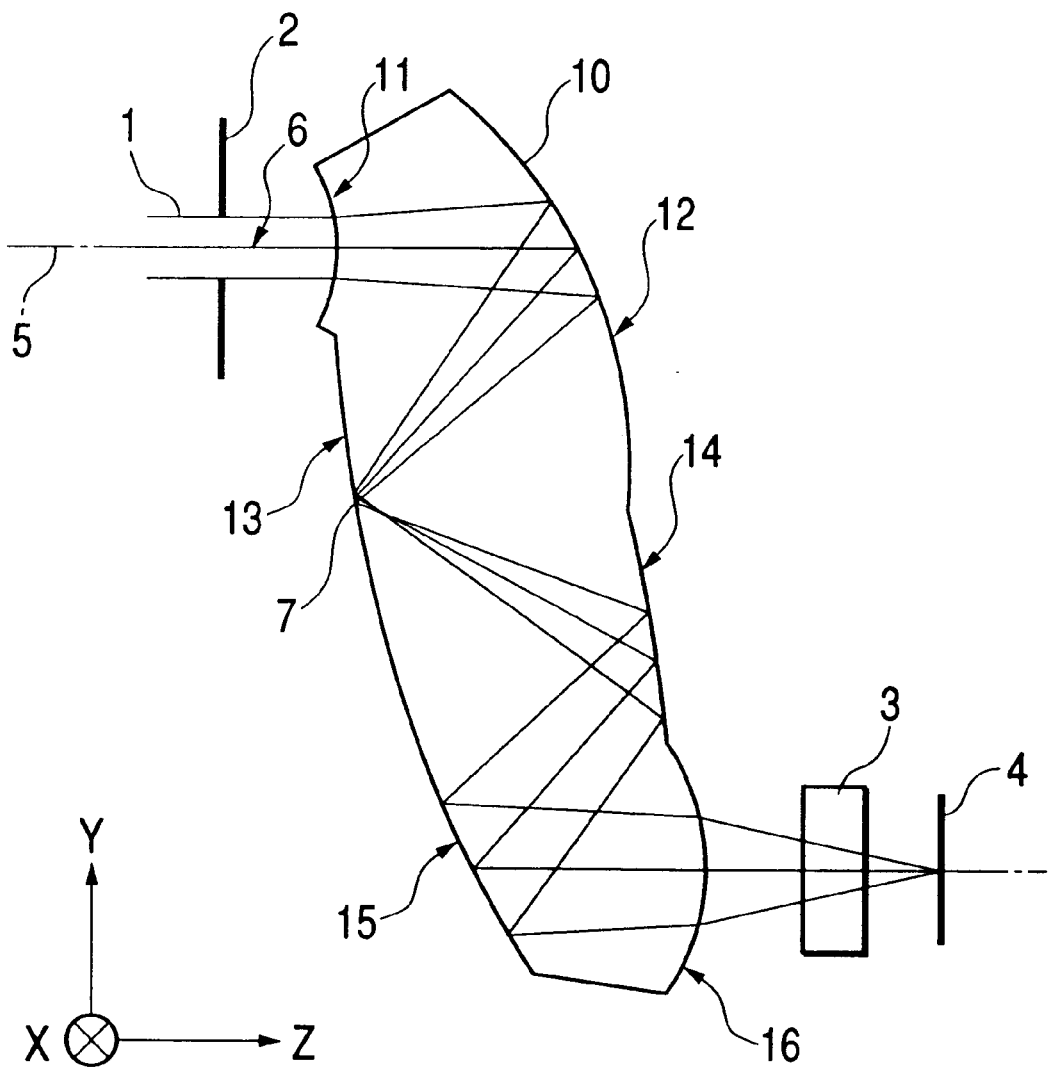
FIG. 8 is an explanatory diagram to illustrate the conventional optical system.
Figure 9:
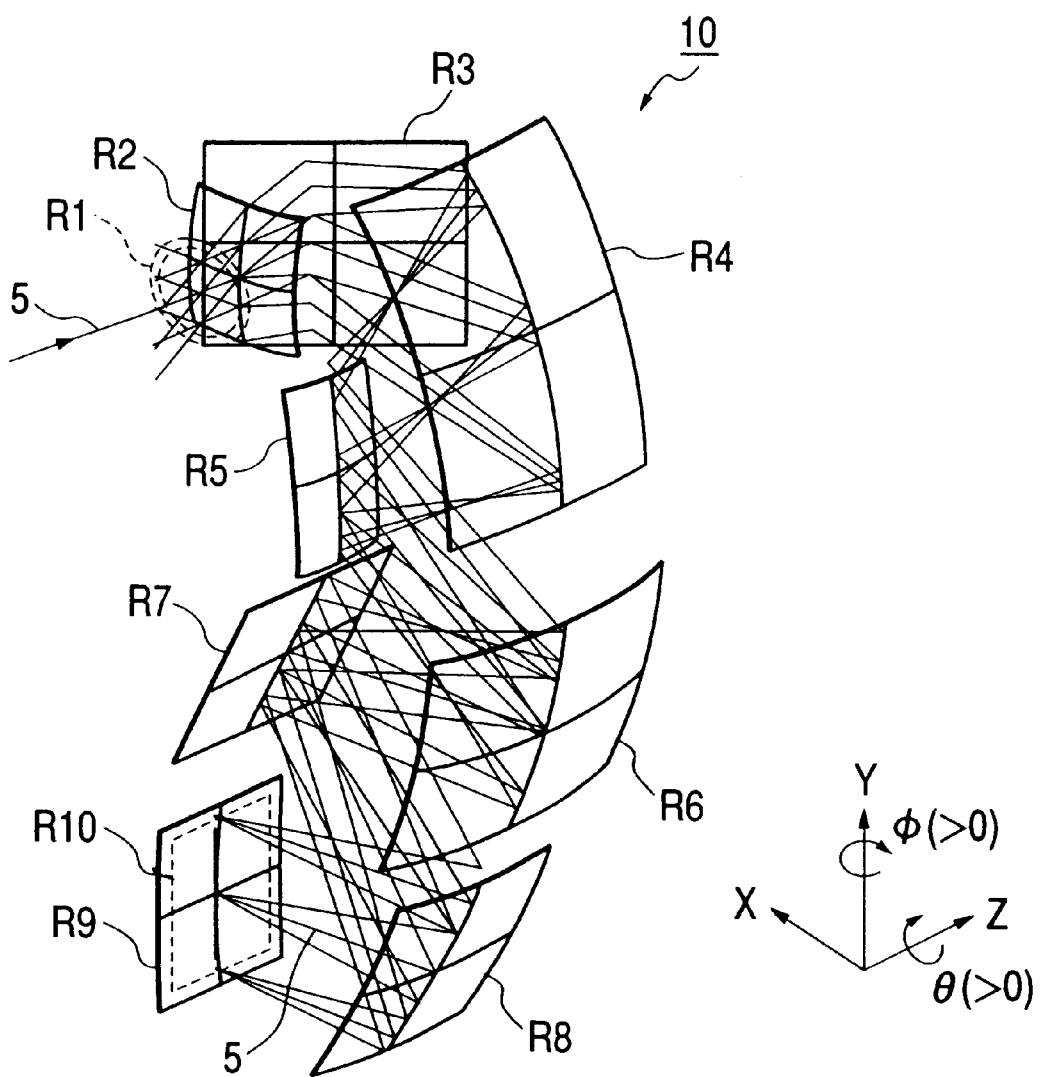
FIG. 9 is an explanatory diagram to illustrate the conventional optical system.

FIG. 6 is a cross-sectional view of the main part of another optical element to show Embodiment 2 of the present invention, which is a sectional view of the optical element cut by the plane including the reference axis of the refracting surface R2, reflecting surface R3, and refracting surfaces R4, R5 of the optical element similar to the optical element 1 of Embodiment 1.

The stop R1, refracting surface R2, reflecting surface R3, refracting surface R5, reflecting surfaces R7 to R10, refracting surface R11, image plane R12, infrared cut filter 6, and low-pass filter 7 constituting the present embodiment are all the same as those in Embodiment 1 and thus the description thereof is omitted herein.

The refracting surface R2, reflecting surface R3, and refracting surface R4 are integrally formed in the prism 2, and the prism 2 is fitted to a part of the offaxial optical block 3 through a reference part 8 provided outside the optically effective area of the refracting surface R4.

A ring-shaped shield member 9 for intercepting rays outside the effective area is provided outside the optically effective area of the refracting surface R4.

In the present embodiment the refracting surface R4 is not joined to the refracting surface R5. This structure allows the refracting surfaces R4, R5 to be used for correction for aberration, thus constructing the optical system with higher performance.

The provision of the reference part 8 to implement fitting between the prism 2 and the offaxial optical block 3 facilitates positioning of the prism 2 and the offaxial optical block 3 and thus simplifies the assembly and adjustment steps.

Unwanted rays are intercepted by the shield member 9, thereby preventing occurrence of ghost.

A variety of forms can be contemplated in the imaging apparatus such as cameras, and in connection therewith, it is sometimes preferable that the layout of the photographing optical system be such that the entrance reference axis is not parallel to the exit reference axis.

In such cases, according to each of Embodiments 1, 2 described above, the optical system with the entrance reference axis and the exit reference axis being not parallel can be constructed readily by forming the reference-axis-bending prism separately from the offaxial optical block and joining it to the offaxial optical block.

The degradation of optical performance due to the positional deviation between the bending prism and the offaxial optical block can be prevented by constructing the optical surfaces of the bending prism in the form of planes or surfaces with small curvature including offaxial surfaces.

The positioning between the bending prism and the offaxial optical block is facilitated by provision of the reference part in the joint surfaces between the bending prism and the offaxial optical block, which can simplify the assembly and adjustment steps.

When the bending prism and the offaxial optical block are made of materials with an equal coefficient of linear expansion, the optical system can be constructed in the structure without positional deviation between the bending prism and the offaxial optical block due to temperature change.

The occurrence of ghost can be prevented by providing the shield portion outside the ray effective area between the bending prism and the offaxial optical block.

When either the bending prism or the offaxial optical block is made of a material not transmitting ultraviolet light, the optics thereafter can be made of a material weak against ultraviolet light, which increases the range of material selection. For example, the material can be selected from readily processable materials.

When either the bending prism or the offaxial optical block is made of a material not transmitting infrared light, the infrared cut filter needed before can be omitted, which can decrease the number of components.

The optical element of the present embodiment can enjoy the effects as described above.

Namely, the optical element of the present embodiment permits easier assembly and production of the optical element wherein a plurality of reflecting surfaces consisting of curved surfaces and planes are formed on surfaces of the transparent body, thereby permitting accomplishment of the optical element with high optical performance and the imaging apparatus using it.

Even if the cases wherein the entrance reference axis and the exit reference axis are not in a common plane, the optical element can also be designed without any restrictions on the shape of the optical element, thereby permitting accomplishment of the optical element advantageous in terms of forming accuracy as well and the imaging apparatus using it.

What is claimed is:

1. An optical element comprising:
   a first optical member which is a transparent body having two refracting surfaces and a reflecting, curved surface symmetric only with respect to one symmetry plane and a reference axis of which is present in said symmetry plane; and
   a second optical member which is a transparent body having two refracting surfaces and a reflecting surface, with the reference axis within said second optical member not being present in said symmetry plane, wherein one refracting surface of said second optical member is coupled to one refracting surface of said first optical member,
   where said reference axis is defined by a ray passing an image center and a pupil center of an optical system including said optical element.

2. The optical element according to claim 1, wherein a shape of one refracting surface of said second optical member is identical to a shape of one refracting surface of said first optical member and said two refracting surfaces are joined to each other.

3. The optical element according to claim 2, wherein the following condition is satisfied:

$$|Cur4/\phi|<0.1$$

where Cur4 is curvature of the joint surfaces at the junction of said two refracting surfaces and $\phi$ an optical power of said optical element.

4. The optical element according to claim 2, wherein said joint surfaces are planes.

5. The optical element according to claim 1, wherein the following condition is satisfied:

$$|Cur2/\phi|<0.1$$

where Cur2 is curvature of the other refracting surface of said second optical member and $\phi$ an optical power of said optical element.

6. The optical element according to claim 1, wherein the following condition is satisfied:

$$|Cur3/\phi|<0.1$$

where Cur3 is curvature of the reflecting surface of said second optical member and $\phi$ an optical power of said optical element.

7. The optical element according to claim 6, wherein the reflecting surface of said second optical member is a plane.

8. The optical element according to claim 1, wherein a part for positioning between said first optical member and said second optical member is provided outside a ray effective area of one refracting surface of said first optical member and one refracting surface of said second optical member.

9. The optical element according to claim 1, wherein a refractive index of said first optical member and a refractive index of said second optical member are substantially equal.

10. The optical element according to claim 1, wherein a coefficient of linear expansion of said first optical member and a coefficient of linear expansion of said second optical member are substantially equal.

11. An optical apparatus comprising:
    an optical system having the optical element of claim 1.

* * * * *

UNITED STATES PATENT AND TRADEMARK OFFICE
CERTIFICATE OF CORRECTION

PATENT NO.    : 6,335,837 B1
DATED         : January 1, 2002
INVENTOR(S)   : Aratani et al.

It is certified that error appears in the above-identified patent and that said Letters Patent is hereby corrected as shown below:

Column 2,
Line 30, "both" should be deleted; and
Line 49, "all lies" should read -- lies --.

Column 3,
Line 10, "Ladi-Open" should read -- Laid-Open --;
Line 18, "R7, and" should read -- R7, --; and
Line 27, "both" should be deleted.

Column 4,
Line 6, "a reflecting surface" should read -- a second optical member which is a transparent body having two refracting surfaces and a reflecting surface --.

Column 6,
Line 28, "R1" should read -- Ri --.

Column 9,
Line 67, "surfaces" should read -- surface --.

Column 10,
Line 32, "Joint" should read -- joint --.

Column 13,
Line 37, "if" should read -- in --.

Signed and Sealed this

Twenty-second Day of October, 2002

Attest:

Attesting Officer

JAMES E. ROGAN
Director of the United States Patent and Trademark Office